Aug. 12, 1947.  K. C. CRUMRINE  2,425,512
MEASUREMENT OF THICKNESS
Filed Nov. 21, 1945
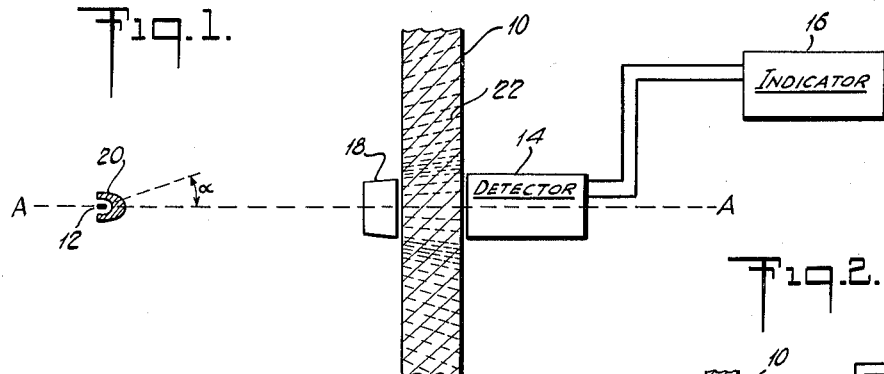
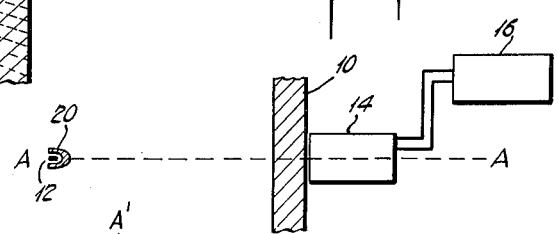
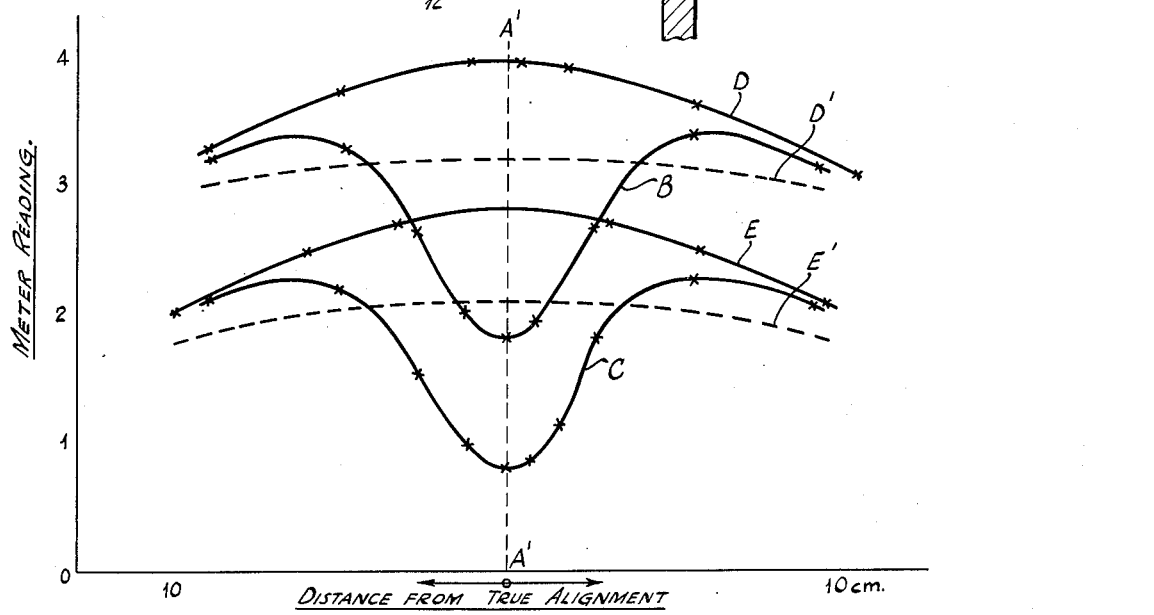
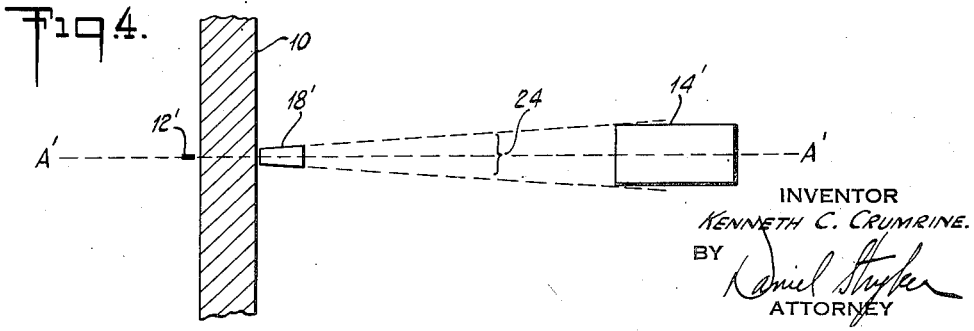
INVENTOR
KENNETH C. CRUMRINE.
BY
ATTORNEY

UNITED STATES PATENT OFFICE 2,425,512

MEASUREMENT OF THICKNESS

Kenneth C. Crumrine, Bellaire, Tex., assignor to The Texas Company, New York, N. Y., a corporation of Delaware Application November 21, 1945, Serial No. 630,020

10 Claims. (Cl. 250—83.6)

1

This invention relates to thickness measurement and particularly to a method of accurately and quickly measuring the thickness of a wall or large plate without the necessity of drilling or otherwise disfiguring the object being measured.

In measuring the thickness of an object such, for instance, as a large plate or the wall of a tank or vessel by the so-called straight transmission method a source of penetrative radiation is placed at one side of the wall and a radiation detector held at the other side of the wall exactly opposite the source. The radiation intensity at the detector decreases with increasing wall thickness due to the absorption of the radiation in passing through the wall. In many cases it is difficult in carrying out this method to determine within a reasonable time the point on the surface of the wall which is exactly opposite the radiation source. Naturally, if the detector is not placed at such a point the radiation measured will have passed obliquely through the wall and thus through a distance greater than the perpendicular distance from the source to the opposite side and an erroneous reading will result.

In measuring the thickness of a wall with the transmission method the technique consists of two steps: The positioning of the detector on a line which is normal to the wall and which passes through the source, and secondly the observation of the transmitted radiation intensity with the detector in that position. In order to perform the first step speedily and accurately, the intensity of the radiation opposite the source should be a rapidly varying function of the departure of the detector from the line mentioned above while for accuracy in the second step the intensity should be a slowly varying function of said departure. In the application of Gerhard Herzog, Serial No. 630,017, filed concurrently herewith, a method and an apparatus are disclosed for accomplishing the desired result in which two detectors are used. At first a very small detector or one having a very small area exposed to the transmitted radiation is moved about over the surface of the wall generally opposite the source so as to probe the field of transmitted radiation to locate the point of approximate maximum intensity and thus, approximately the line normal to the wall and passing through the source. After this point has been located the small detector is replaced by a larger detector responsive to a considerably larger portion of the transmitted radiation at and around that point and whereby an accurate determination of the amount of transmitted radiation and thus, the wall thickness can

2 be made, even though this larger detector may be slightly misplaced from the point of true alignment with the source. By suitably calibrating the indicating instruments an accurate determination of the wall thickness can be made.

In accordance with the present invention but one detector is used, the radiation source being placed at some distance from the side of the wall and a radiation absorber placed near or against the wall on the line perpendicular from the source to the wall. By absorbing a portion of the direct radiation a "shadow" is produced in the field of transmitted radiation and it is quite easy for the detector operator to locate approximately the center of the shadow which will be substantially on the above mentioned line normal to the wall and passing through the source.

The second step in the method mentioned hereinbefore can be approximated more closely as the distance from the wall to the source is increased. A limitation is imposed, however, by the fact that the strength of the source must be increased to compensate for the otherwise reduction in intensity at the detector due to the increased distance. It has been found that a compromise can be effected by using a radiation source of reasonable size such, for instance, as 10 mg. of radium about 10 inches from the surface of a steel wall approximately three inches thick and by using an absorber around the source shaped so that the radiation passing perpendicularly toward the wall will be absorbed to a greater extent than that passing toward the wall at any other angle. Through the use of this last mentioned absorber the intensity of the radiation field at the other side of the wall is made more uniform over a comparatively large area and an observation of the intensity by means of a detector placed within that area will provide an accurate measure of the wall thickness. Furthermore by using the second absorber the "shadow" in the radiation field mentioned above is sharpened and its outline made easier to determine. Thus the first step in the method, i. e., the location of the point approximately opposite the source, is carried out by using an absorber near the wall which casts a suitable shadow with the axis of symmetry coinciding with a line from the source perpendicular to the wall. The second step, i. e., the measurement of the intensity and thus the wall thickness, is carried out after the removal of the first absorber by positioning or leaving the detector at the point which had been substantially the center of the shadow and by carefully measuring the intensity at that point.

For a better understanding of the invention reference may be had to the accompanying drawing in which:

Figure 1 is a vertical, sectional elevation through a wall, the thickness of which is to be measured, with an absorber in place to assist in the location of the point perpendicularly opposite the source, Figure 2 is a similar view with the first absorber removed, Figure 3 shows output curves made in a laboratory in measuring the thickness of two different steel plates and where the point on the wall surface on a line from the source perpendicular to the wall was known, and Figure 4 is a view similar to Figure 1 but of a modification.

Referring to the drawing, 10 designates a section of a wall or plate the thickness of which is to be measured. A source of penetrative radiation 12 such as gamma rays is mounted by any suitable means such as a small framework, not shown, held against the side of the wall 10 as by means of permanent magnets so that the source will be at an appreciable distance, at least two or three times the approximate wall thickness, from the wall. It has been found that 10 mg. of radium disposed about 10 inches from a steel wall having a thickness of around three inches is satisfactory. On the other side of the wall is shown a radiation detector 14 which may be a Geiger-Mueller counter, an ionization chamber or a counter of the type disclosed in the U. S. Letters Patent of D. G. C. Hare, No. 2,397,071, granted March 19, 1946. The output of the detector is led either through a preamplifier enclosed in the detector housing or directly to an instrument 16 capable of amplifying and indicating the intensity of the radiation to which the detector responds. The instrument 16 can, if desired, be calibrated directly in thickness. The line A—A represents a perpendicular to the wall 10 passing through the source 12.

As has been explained hereinbefore, it is difficult if not impossible for an operator manipulating the detector 14 to locate the point where the line A—A intersects the side surface of the wall 10 exactly opposite the source 12 and to obviate this difficulty a radiation absorbing member 18 which may be of lead, when gamma rays are used, and in the shape, for instance, of the frustum of a cone, is disposed closely adjacent or against the wall and centered on the line A—A from the source 12 perpendicular to the wall. The radiation source 12 may be at least partially surrounded by means of a second absorber 20 of brass, or the like, and it will be observed that the thickness of the absorber 20 on the line A—A is greater than the thickness on any other line passing through the source. The curvature of the absorber is such that the field of radiation transmitted through the plate or wall 10 will be essentially constant in intensity over the area generally opposite the source as will be explained more fully hereinafter.

The dotted lines 22 indicate schematically the radiation originating in the source 12 and passing through the wall and due to the absorbing effect of the member 18 the field of transmitted radiation in that portion of the wall between the absorber and the detector 14 will be much weaker than the adjacent field, the radiation of which has not passed through the absorber 18. Thus, the operator in moving the detector 14 about over the surface of the wall and observing the indication of the device 16 can quickly locate approximately the center point of the radiation "shadow" produced by the presence of the absorber, which point will, of course, be substantially on the afore-mentioned line A—A normal to the wall and passing through the source 12.

Referring to Figure 3 the intensity curve B was made in the laboratory while using a source of 10 mg. of radium and a gamma ray counter four inches long and two inches in diameter on the surface of a large steel plate three inches in thickness, with a lead absorber 18 substantially one inch thick and one and one-half inches in diameter, in position. It will be observed that the dip in the curve B representing the "shadow" of the absorber is pronounced. In Figure 3 the dotted line A'—A' corresponds to the line A—A of Figure 1 and it will be observed that the curve B reaches its lowest point, i. e., the center of the shadow, where it intersects that line. The curve C is similar to curve B but represents the output of the same detector when measuring a steel plate 3.25 inches in thickness. The curve D was made in measuring the three inch steel plate with the detector 14 positioned variously along a line passing through the point of minimum intensity located as previously described and with the absorber 18 removed. The broad peak of the curve D is apparent. The curve E is similar to curve D but is made with the 3.25 inch steel plate.

When curves B, C, D and E were made, the absorber 20 shown around the source 12 in Figure 1 was not used. By introducing a properly shaped absorber 20 the curves D and E of Figure 3 can be further flattened out as shown by the dotted lines D' and E'. Obviously, the flatter these lines are, the less accurately the true minimum of curves B and C will have to be determined. Practically, this shield 20 takes very little material. In my experiments the source A was inserted into a hole which was drilled into a cylindrical brass rod of approximately one-fourth inch diameter. The outside end of the brass rod was then shaped in such a way that the wall thickness along the line A—A was slightly larger than in any other direction and this transition from the thickest point of the wall to the thinnest point which is at 90 degrees to A—A was, of course, made gradually.

In summarizing the operation, the source 12 is positioned at some distance from the surface and the absorber 18 is located close to the surface centered on the line A—A, that is, on the perpendicular from the source to the surface. This may be achieved by mounting the source 12 in a holder, not shown, which automatically positions the absorber 18 correctly. The gamma ray field on the opposite side of the wall is then explored with the detector 14. In a laboratory experiment the line A—A of Figure 1 can of course be established accurately without the use of the detector. In this case one can take measurements of the output of the detector 14 with respect to the distance from A—A and obtain curves B and C as shown in Figure 3. In practical application in the field the line A—A is, of course, not known and one must move the detector 14 along the surface. By so doing one may find first, in a certain direction, an increase in the intensity and if this direction is followed further, a sharp decrease in intensity may be noted, this being due to the presence of the shadow. Of course, if no sharp decrease in intensity is found, the detector will be moved in a different direction until the sudden decrease is noted. One could now, of course, probe or explore the radiation field carefully and try to find exactly where the minimum intensity occurs and that would be the accurate position of A—A. This is, however, not necessary and it would be extremely tedious to do so. It is sufficient to find approximately the location of minimum intensity. After this step of preliminary exploration is finished, the absorber 18 is removed and a reading of the intensity is taken by means of the instrument 16. From curves D and E of Figure 3, which were supposedly established beforehand in the laboratory, where the exact position of A—A is known, it can be seen that a small error in the location of the true minimum with absorber 18 has very little effect on the intensity which is measured after 18 has been removed. This error can often therefore be tolerated in order to facilitate the measurement of the wall thickness.

If one would take sufficient time without absorber 18 to locate the true maximum of curves D and E there would, of course, be little reason for using absorber 18. The time required for this would be very considerable and the main advantage of the proposed method consists in the speed with which the measurement can be taken. My experiments have proved that it is a very rapid procedure to find approximately the minimum of the trough with the absorber in place and to do that with such an accuracy that only a negligible error is introduced in the determination of the wall thickness after 18 has been removed.

Although gamma radiation has been mentioned as the medium to be measured, other forms of radiation or penetrating particles such as neutrons can be used if desired, it being necessary merely to substitute a neutron detector for the gamma ray detector 14 and suitable materials such as paraffin and cadmium for the shields 18 and 22, which may then take a different shape.

The method which has been described is particularly advantageous in certain instances. For instance with the straight transmission method, where the source and detector are positioned at opposite surfaces of the wall it is always possible that the source may be located near a wall section which may have a slight depression or possibly a small porous cavity caused by rust or other corrosion and entirely invisible to the one positioning the source. There would of course be less absorption of the radiation through the porous section and the detector operator would naturally position his instrument where the greatest intensity is observed. Due to the presence of the depression or porous section near but not directly under the source, the maximum intensity might be observed at a point or area not directly opposite the source but at a slight distance laterally from the true perpendicular alignment and an inaccurate measurement of the thickness would result. Abnormal absorption caused by the presence of a protuberance such as a welded spot or a supporting channel or angle iron near the source, might, in the present method mislead the operator into locating the detector at a point of minimum intensity not directly opposite the source. When the method of the present invention is used, however, the very considerable absorption in the member 18 would cause a sharp outline of the shadow in the radiation field which could be easily located, even though the absorbing member were placed near a protuberance, a depression or a hidden porous section in the wall. In the case of the protuberance or a thickened portion of the wall, when the absorber 18 is removed the absence of a large increase in radiation intensity would immediately inform the detector operator that an incorrect alignment of source and detector existed and another point of location for the detector could then be found leading to a correct alignment of source and detector and hence to a correct measurement of the wall thickness.

Although the source has been shown as spaced from the wall surface in a fixed relation thereto, say, on the inside of a large vessel or tank, there may be instances where the vessel is too small to permit an operator to enter and to properly position the source and absorber 18. In such a case and with reference to Figure 4, the source 12 may be positioned substantially against the inner surface of the wall and a suitable frame holding the absorber 18' and the detector 14' then moved about over the outer surface. When the source, absorber and detector are in alignment the "shadow" of the absorber indicated as 24, will fall upon the detector and this will be immediately noted by the operator. The absorber 18' will then be removed and the measurement of intensity made as described with reference to Figure 2.

Again, there may be times when it is found advisable to fix the detector 14 at a predetermined position on the wall, as shown in Figure 1 and to move the combination of the source 12 and absorber 18 about over the opposite surface until the true alignment has been found, the relative position of the source 12 and absorber 18 being maintained, of course, during the exploring operation.

In the copending application of Herzog, Lord, Evans and Heath, Serial No. 574,870, filed January 26, 1945, electrical circuits are disclosed which can be used in connection with the amplification and the indication of the output of the detector 14.

Obviously many other modifications and variations of the invention, as hereinbefore set forth, may be made without departing from the spirit and scope thereof and, therefore, only such limitations should be imposed as are indicated in the appended claims.

I claim:

1. The method of measuring the thickness of a wall or plate which comprises bombarding said wall with penetrative radiation from a source located on one side of the wall whereby radiation is transmitted through the wall to produce a radiation field at the side of the wall opposite the source, exploring said radiation field by means responsive to variations in radiation intensity while absorbing a portion of the radiation by means so disposed that when said source, said absorbing means and said exploring means are in alignment said absorbing means will cause a radiation "shadow" to fall upon the exploring means, stopping the exploring operation when said shadow produces a minimum in the intensity reading of said exploring means, removing the absorbing means and measuring the intensity of the transmitted radiation.

2. The method of measuring the thickness of a wall or plate which comprises bombarding said wall with penetrative radiation from a source located at a distance of several inches from one side of the wall whereby some of the radiation is transmitted through the wall to produce a radiation field at the side of the wall opposite the source, absorbing part of the radiation passing from the source on a line normal to said wall to produce a "shadow" in said radiation field, exploring said field to determine approximately the point of minimum intensity at the center of said shadow, discontinuing said absorbing action and then measuring the intensity of the radiation transmitted through the wall at said point, said measurement being indicative of the thickness of said wall at said point.

3. The method of measuring the thickness of a wall or plate which comprises bombarding said wall with penetrative radiation from a source located at a distance from one side of the wall equal at least to several times the approximate wall thickness whereby some of the radiation is transmitted through the wall to produce a radiation field at the side of the wall opposite the source, the intensity of said field at a point directly opposite the source being but slightly greater than the intensity of the field a few centimeters from said point, absorbing part of the radiation passing from the source on a line normal to said wall to produce a "shadow" in said radiation field, exploring said field to determine approximately the center of said shadow, discontinuing said absorbing action and then measuring the intensity of the radiation transmitted through the wall at the point determined to be the center of said shadow, said measurement being indicative of the thickness of said wall at said point.

4. The method of measuring the thickness of a wall or plate which comprises placing a source of penetrative radiation at one side of said wall and separated from the wall by a distance of several inches, placing a radiation absorber substantially at the surface of said wall and on a line perpendicular from said source to said wall whereby a "shadow" is produced in the field of radiation transmitted from said source through said wall, exploring said radiation field on the side of the wall opposite the source so as to determine approximately the point of minimum intensity at the center of said shadow and which point will be on said perpendicular line, removing said absorber, and then measuring at said point the intensity of the transmitted radiation.

5. The method of measuring the thickness of a wall or plate which comprises bombarding said wall with penetrative radiation from a source located at a distance from one side of the wall equal to at least three times the approximate thickness whereby some of the radiation is transmitted through the wall to produce a radiation field at the side of the wall opposite the source, absorbing part of the radiation passing from the source on a line normal to said wall just before it reaches the wall to produce a "shadow" in said radiation field at the opposite side of the wall, exploring said field to determine approximately the point of minimum intensity at the center of said shadow, discontinuing said absorbing action and then measuring the intensity of the radiation transmitted through the wall at said point, said measurement being indicative of the thickness of said wall at said point.

6. The method of measuring the thickness of a wall or plate which comprises placing a source of penetrative radiation near one side of said wall, placing a radiation absorber near the opposite side of the wall, probing the field of transmitted radiation by radiation responsive means in a plane parallel to said wall and separated from the wall by a distance equal to at least two or three times the approximate wall thickness while said absorber is maintained at a constant distance from the detector and on a line from said detector perpendicular to said wall, said absorber serving to produce a shadow in said radiation field which shadow will cover said radiation responsive means when said source, said absorber and said means are in substantial alignment, stopping said probing operation when said alignment is effected, removing said absorber and measuring the intensity of the transmitted radiation.

7. The method of measuring the thickness of a wall or plate which comprises bombarding said wall with penetrative radiation from a source located on one side of the wall whereby radiation is transmitted through the wall to produce a radiation field at the side of the wall opposite the source, rendering that portion of the radiation field generally opposite the source substantially uniform in intensity by absorbing direct radiation passing toward said wall, the radiation passing from the source perpendicularly toward the wall being absorbed to a greater extent than the radiation passing toward the wall at an angle less than 90°, exploring said radiation field by means responsive to variations in radiation intensity while absorbing another portion of the radiation by means so disposed that when said source, said last named absorbing means and said exploring means are in alignment said last named absorbing means will cause a radiation "shadow" to fall upon the exploring means, stopping the exploring operation when said shadow produces a minimum in the intensity reading of said exploring means, removing the last named absorbing means and measuring the intensity of the transmitted radiation.

8. The method of measuring the thickness of a wall or plate which comprises bombarding said wall with penetrative radiation from a source located at a distance of several inches from one side of the wall whereby some of the radiation is transmitted through the wall to produce a radiation field at the side of the wall opposite the source, rendering that portion of said radiation field generally opposite said source substantially uniform in intensity by absorbing, in the immediate vicinity of said source direct radiation passing toward said wall, the radiation passing perpendicularly toward the wall being absorbed to a greater extent than the radiation passing toward the wall at an angle less than 90°, absorbing part of the radiation passing from the source on a line normal to said wall to produce a "shadow" in said radiation field, exploring said field to determine approximately the point of minimum intensity at the center of said shadow, discontinuing said absorbing action and then measuring the intensity of the transmitted radiation transmitted through the wall at and around said point.

9. The method of measuring the thickness of a wall or plate which comprises placing a source of penetrative radiation at one side of said wall and separated from the wall by a distance of several inches, placing a radiation absorber substantially at the surface of said wall and on a line perpendicular from said source to said wall whereby a "shadow" is produced in the field of radiation transmitted from said source through said wall, exploring said radiation field on the side of the wall opposite the source so as to determine approximately the point of minimum intensity at the center of said shadow and which point will be substantially on said perpendicular line, removing said absorber, rendering the radiation field around said point substantially uniform in intensity by absorbing, in the immediate vicinity of said source direct radiation passing toward said wall, the radiation passing perpendicularly toward the wall being absorbed to a greater extent than the radiation passing toward the wall at an angle less than 90°, and then measuring the intensity of the transmitted radiation transmitted through the wall at and around said point.

10. The method of measuring the thickness of a wall or plate which comprises placing a source of penetrative radiation at one side of said wall and separated from the wall by a distance of several inches so that some of the radiation will be transmitted through the wall to produce a radiation field at the side of the wall opposite said source, rendering that portion of the radiation field generally opposite the source substantially uniform by absorbing, in the immediate vicinity of said source direct radiation passing toward said wall, the absorbing effect around the source increasing progressively toward a line perpendicular from the source to the wall, placing a radiation absorber substantially at the surface of said wall and on said perpendicular line whereby a "shadow" is produced in the field of radiation transmitted from said source through said wall, exploring said radiation field on the side of the wall opposite the source so as to determine approximately the point of minimum intensity at the center of said shadow and which will be on said perpendicular line, removing said absorber, and then measuring the intensity of the transmitted radiation transmitted through the wall at and around said point.

KENNETH C. CRUMRINE.

REFERENCES CITED

The following references are of record in the file of this patent:

UNITED STATES PATENTS

| Number | Name | Date |
|---|---|---|
| 2,346,486 | Hare | Apr. 11, 1944 |
| 2,349,429 | Herzog et al. | May 23, 1944 |